United States Patent
Sheng et al.

(10) Patent No.: US 12,212,662 B2
(45) Date of Patent: Jan. 28, 2025

(54) METHOD FOR INTERNET KEY EXCHANGE PROTOCOL AUTHENTICATION USING CERTIFICATE AND COMMUNICATION DEVICE

(71) Applicant: HUAWEI TECHNOLOGIES CO., LTD., Guangdong (CN)

(72) Inventors: De Sheng, Shanghai (CN); Hui Ye, Shanghai (CN); Wenbin Shen, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 315 days.

(21) Appl. No.: 17/946,542

(22) Filed: Sep. 16, 2022

(65) Prior Publication Data

US 2023/0023846 A1    Jan. 26, 2023

Related U.S. Application Data

(63) Continuation of application No. PCT/CN2021/081054, filed on Mar. 16, 2021.

(30) Foreign Application Priority Data

Mar. 18, 2020    (CN) .......................... 202010192532.5

(51) Int. Cl.
*H04L 9/08* (2006.01)
*H04L 9/32* (2006.01)

(52) U.S. Cl.
CPC .......... *H04L 9/0825* (2013.01); *H04L 9/3268* (2013.01)

(58) Field of Classification Search
CPC ... H04L 9/0825; H04L 9/3268; H04L 9/3263; H04L 63/061; H04L 63/0823;
(Continued)

(56) References Cited

U.S. PATENT DOCUMENTS 8,031,672 B2 * 10/2011 Balaji ................ H04L 63/0428
                                                      370/331
9,667,619 B1 * 5/2017 Vera-Schockner ... H04L 69/162
(Continued)

FOREIGN PATENT DOCUMENTS

CN         101677440 A       3/2010
CN         102026192 A       4/2011
(Continued)

OTHER PUBLICATIONS

"How do I parse an x509 certificate and extract its key's signature algorithm?" Apr. 10, 2020; stackoverflow.com (https://stackoverflow.com/questions/61150265/how-do-i-parse-an-x509-certificate-and-extract-its-keys-signature-algorithm); retrieved Sep. 21, 2024. (Year: 2020).*

(Continued)

*Primary Examiner* — J. Brant Murphy
(74) *Attorney, Agent, or Firm* — WOMBLE BOND DICKINSON (US) LLP

(57) ABSTRACT

This application discloses a method for Internet key exchange protocol (IKE) authentication using a certificate. The method includes: A first device parses a certificate to obtain signature information in the certificate. The first device fills an AUTH payload field in an IKE identity authentication (AUTH) message based on the signature information in the certificate, where signature information indicated by the AUTH payload field matches the signature information in the certificate. The first device sends the IKE AUTH message to a second device. In the method for Internet key exchange protocol IKE authentication using a certificate provided in this application, the first device may automatically parse the signature information in the certificate, and fill the related field of the IKE AUTH message
(Continued)

based on the signature information. Therefore, user configuration is simplified and product usability is improved.

20 Claims, 5 Drawing Sheets

(58) Field of Classification Search
CPC ... H04L 63/126; H04L 63/164; H04L 9/0844; H04L 9/3247; H04L 69/22
See application file for complete search history.

(56) References Cited

U.S. PATENT DOCUMENTS

| | | | |
|---|---|---|---|
| 2006/0019635 A1* | 1/2006 | Ollila | H04L 63/08 455/410 |
| 2006/0209789 A1* | 9/2006 | Gupta | H04L 69/04 370/352 |
| 2007/0204160 A1* | 8/2007 | Chan | H04L 9/0838 713/171 |
| 2008/0219224 A1* | 9/2008 | Balaji | H04W 12/03 370/338 |
| 2021/0377049 A1* | 12/2021 | Nix | H04L 9/0877 |
| 2022/0417036 A1* | 12/2022 | Donlan | H04L 63/0823 |
| 2023/0308424 A1* | 9/2023 | Nix | H04L 9/085 |

FOREIGN PATENT DOCUMENTS

| | | |
|---|---|---|
| CN | 102088699 A | 6/2011 |
| CN | 102413103 A | 4/2012 |
| WO | 2020025138 A1 | 2/2020 |

OTHER PUBLICATIONS

T. Kivinen et al., "Signature Authentication in the Internet Key Exchange Version 2 (IKEv2)",Jan. 2015, total:18pages.
C. Kaufman et al.,"Internet Key Exchange Protocol Version 2 (IKEv2)", Oct. 2014,total:142pages.
T. Kivinen et al., "Signature Authentication in the Internet Key Exchange Version 2 (IKEv2)",Jan. 2015, total:18paegs.
CISCO et al., "Configuring Internet Key Exchange Version 2 (IKEv2)", Mar. 18, 2020,total 28pages.
Junipper et al., "proposal (Security IKE)",Sep. 21, 2024,total:4pages.
Strongswan et al.,"ipsec.conf: conn name> General Connection Parameters", Mar. 18, 2020,total: 8pages.https://wiki.strongswan.org/projects/strongswan/wiki/ConnSection.
Kaufman Microsoft P Hoffman VPN Consortium Y NIR Check Point P Eronen Independent T Kivinen Inside Secure C: "Internet Key Exchange Protocol Version 2 (IKEv2); rfc7296.txt", Internet Engineering Task Force, IETF; Standard, Internet Society (ISC) 4, Rue Des Falaises CH-1205. Geneva, Switzerland, Oct. 25, 2014 (Oct. 25, 2014), pp. 1-142, XP015104486.

* cited by examiner

METHOD FOR INTERNET KEY EXCHANGE PROTOCOL AUTHENTICATION USING CERTIFICATE AND COMMUNICATION DEVICE

CROSS-REFERENCE TO RELATED APPLICATIONS

This application is a continuation of International Application No. PCT/CN2021/081054, filed on Mar. 16, 2021, which claims priority to Chinese Patent Application No. 202010192532.5, filed on Mar. 18, 2020. The disclosures of the aforementioned applications are hereby incorporated by reference in their entireties.

TECHNICAL FIELD

This application relates to the field of computers, and in particular, to a method for Internet key exchange protocol authentication using a certificate and a communication device.

BACKGROUND

When a certificate is used for Internet key exchange protocol version 2 (IKEv2) authentication, signature information carried in an IKE message needs to be configured by a user.

Incorrect configuration performed by the user will cause an authentication failure. For example, the user needs to configure an elliptic curve digital signature algorithm (ECDSA) as a public key algorithm, but the user configures an Rivest-Shamir-Adleman algorithm (RSA algorithm) as the public key algorithm. Due to the incorrect configuration, the authentication fails. For another example, when the user configures the ECDSA algorithm, the user misspells "ECDSA" as "EDCSA" for configuration, the authentication also fails.

In addition, configuration commands of devices from different vendors are different. When the user needs to configure devices from different vendors for authentication, the user needs to learn the configuration commands of the devices from the vendors. For example, when the public key algorithm to be configured is the RSA algorithm, the configuration commands vary with vendors. Examples are as follows.

A configuration command of a device from vendor A is:
authentication {local{rsa-sig|pre-share|ecdsa-sig}|remote{eap[query-identity]|rsa-sig|pre-share|ecdsa-sig}.

A configuration command of a device from vendor B is: authentication-method (dsa-signatures|pre-shared-keys|rsa-signatures).

A configuration command of a device from vendor C is:
authby=pubkey|rsasig|psk|secret|xauthrsasig|xauthpsk|never.

A configuration command of a Eudemon device from Huawei is:
authentication-method {pre-share|rsa-signature|digital-envelope}.

A configuration command of a device from vendor D is:
authentication-method {pre-share|rsa-sig}.

Consequently, the existing IKE authentication has a high requirement on the user.

SUMMARY

This application provides a method for Internet key exchange protocol (IKE) authentication using a certificate and a communication device. A first device may automatically parse a certificate to obtain signature information in the certificate, and fill a related field in an IKE identity authentication (AUTH) message based on the signature information. A user does not need to configure specific signature information.

According to a first aspect, a method for IKE authentication using a certificate is provided. The method includes: A first device parses a certificate to obtain signature information in the certificate. The first device fills an AUTH payload field in an IKE identity authentication AUTH message based on the signature information, where signature information indicated by the AUTH payload field matches the signature information in the certificate. The first device sends the IKE AUTH message to a second device. The first device is an initiator of authentication, and the second device is a responder of the authentication. The IKE AUTH message filled by the first device is an IKE_AUTH request message. The AUTH payload field indicates a signature information type supported by the first device in the authentication, and there is a mapping relationship between a filling value of the AUTH payload field and the signature information in the certificate.

In the foregoing technical solution, the first device may automatically parse a certificate file, obtain the signature information in the certificate, and automatically fill the AUTH payload field in the AUTH message based on the signature information. A user does not need to configure specific signature information in the AUTH payload field, thereby avoiding incorrect configuration performed by the user.

In an embodiment, the signature information in the certificate includes a public key algorithm.

In another embodiment, the signature information in the certificate further includes at least one of a signature filling manner, a Hash algorithm, or an expansion algorithm.

In another embodiment, the signature information in the certificate includes an object identifier, where the object identifier is code of the signature information in the certificate.

In the foregoing technical solution, after parsing the certificate, the first device may obtain the signature information in a plurality of forms from the certificate, thereby improving flexibility of obtaining the signature information by the first device.

In another embodiment, before the first device parses the certificate to obtain the signature information in the certificate, the method further includes: The first device obtains first configuration information, where the first configuration information indicates a type of the method for IKE authentication using a certificate.

In another embodiment, the type of operation for IKE authentication using a certificate is general certificate signature authentication; or the type of operation for IKE authentication using a certificate is general asymmetric key algorithm authentication. When the type of operation for IKE authentication using a certificate is the general asymmetric key algorithm authentication, the first configuration information further indicates a source of signature information of the general asymmetric key algorithm authentication.

In the foregoing technical solution, the user only needs to set the first configuration information, and does not need to configure specific signature information in the IKE AUTH message, thereby simplifying user configuration and avoiding incorrect configuration.

In another embodiment, before the first device fills the AUTH payload field in the IKE AUTH message based on the signature information in the certificate, the method further includes: The first device determines that both the first device and the second device support a digital signature. When both the first device and the second device support the digital signature, the first device fills the AUTH payload field in a digital signature manner, where a filling value of an algorithm identifier field in the AUTH payload field is distinguished encoding rules DER code of the object identifier.

In the foregoing technical solution, the first device may automatically fill the AUTH payload field in the IKE AUTH message based on the signature information in the certificate and a signature filling manner supported by the first device and the second device. The user does not need to perform configuration, thereby improving accuracy of the IKE AUTH message and avoiding incorrect configuration performed by the user.

In another embodiment, that the first device determines that both the first device and the second device support a digital signature includes: The first device obtains second configuration information, where the second configuration information indicates that the first device supports the digital signature. The first device obtains an IKE security association (SA) message sent by the second device, where the IKE SA message indicates that the second device supports the digital signature. The second device is the responder of the authentication, and the IKE SA message sent by the second device is an initial negotiation (IKE_SA_INIT) response message.

According to a second aspect, a method for IKE authentication using a certificate is provided. The method includes: A first device parses a certificate to obtain signature information in the certificate. The first device fills an AUTH payload field in an IKE identity authentication AUTH message based on the signature information in the certificate, where signature information indicated by the AUTH payload field matches the signature information in the certificate. The first device sends the IKE AUTH message to a second device. The first device is a responder of authentication, and the second device is an initiator of the authentication. The IKE AUTH message filled by the first device is an IKE_AUTH response message. The AUTH payload field indicates a signature information type supported by the first device in the authentication, and there is a mapping relationship between a filling value of the AUTH payload field and the signature information in the certificate.

In the foregoing technical solution, the first device may automatically parse a certificate file, obtain the signature information in the certificate, and automatically fill the AUTH payload field in the AUTH message based on the signature information. A user does not need to configure specific signature information in the AUTH payload field, thereby avoiding incorrect configuration performed by the user.

In an embodiment, the signature information in the certificate includes a public key algorithm.

In another embodiment, the signature information in the certificate further includes at least one of a signature filling manner, a Hash algorithm, or an expansion algorithm.

In another embodiment, the signature information in the certificate includes an object identifier, where the object identifier is code of the signature information in the certificate.

In the foregoing technical solution, after parsing the certificate, the first device may obtain the signature information in a plurality of forms from the certificate, thereby improving flexibility of obtaining the signature information by the first device.

In another embodiment, before the first device parses the certificate to obtain the signature information in the certificate, the method further includes: The first device obtains first configuration information, where the first configuration information indicates a type of operation for IKE authentication using a certificate.

In another embodiment, the type of operation for IKE authentication using a certificate is general certificate signature authentication; or the type of operation for IKE authentication using a certificate is general asymmetric key algorithm authentication. When the type of operation for IKE authentication using a certificate is the general asymmetric key algorithm authentication, the first configuration information further indicates a source of signature information of the general asymmetric key algorithm authentication.

In the foregoing technical solution, the user only needs to set the first configuration information, and does not need to configure specific signature information in the IKE AUTH message, thereby simplifying user configuration and avoiding incorrect configuration.

In another embodiment, before the first device fills the AUTH payload field in the IKE AUTH message based on the signature information in the certificate, the method further includes: The first device determines that both the first device and the second device support a digital signature. When both the first device and the second device support the digital signature, the first device fills the AUTH payload field in a digital signature manner, where a filling value of an algorithm identifier field in the AUTH payload field is distinguished encoding rules DER code of the object identifier.

In the foregoing technical solution, the first device may automatically fill the AUTH payload field in the IKE AUTH message based on the signature information in the certificate and a signature filling manner supported by the first device and the second device. The user does not need to perform configuration, thereby improving accuracy of the IKE AUTH message and avoiding incorrect configuration performed by the user.

In another embodiment, that the first device determines that both the first device and the second device support a digital signature includes: The first device obtains second configuration information, where the second configuration information indicates that the first device supports the digital signature. The first device obtains an IKE SA message sent by the second device, where the IKE SA message indicates that the second device supports the digital signature. The second device is the initiator of the authentication, and the IKE SA message sent by the second device is an IKE_SA_INIT request message.

According to a third aspect, a communication device is provided. The communication device includes a memory storing a program, and a processor in communication with the memory. The processor runs the program to enable the device to perform the following operations: parsing a certificate to obtain signature information in the certificate; filling an AUTH payload field in an Internet key exchange protocol IKE identity authentication AUTH message based on the signature information in the certificate, where signature information indicated by the AUTH payload field matches the signature information in the certificate; and sending the IKE AUTH message to a second device. The communication device is an initiator of authentication, and the second device is a responder of the authentication. The IKE AUTH message sent by the communication device is an IKE_AUTH request message. The AUTH payload field indicates a signature information type supported by the communication device in the authentication, and there is a mapping relationship between a filling value of the AUTH payload field and the signature information in the certificate.

In an embodiment, the signature information in the certificate includes a public key algorithm.

In another embodiment, the signature information in the certificate further includes at least one of a signature filling manner, a Hash algorithm, or an expansion algorithm.

In another embodiment, the signature information in the certificate includes an object identifier, where the object identifier is code of the signature information in the certificate.

In the foregoing technical solution, after parsing the certificate, the communication device may obtain the signature information in a plurality of forms from the certificate, thereby improving flexibility of obtaining the signature information by the communication device.

In another embodiment, the program further includes instructions for performing the following operation: Before parsing the certificate to obtain the signature information in the certificate, the communication device obtains first configuration information, where the first configuration information indicates a type of operation for an IKE using a certificate for authentication.

In another embodiment, the type of operation for IKE authentication using a certificate is general certificate signature authentication; or the type of operation for IKE authentication using a certificate is general asymmetric key algorithm authentication. When the type of operation for IKE authentication using a certificate is the general asymmetric key algorithm authentication, the first configuration information further indicates a source of signature information of the general asymmetric key algorithm authentication.

In the foregoing technical solution, the user only needs to set the first configuration information, and does not need to configure specific signature information in the IKE AUTH message, thereby simplifying user configuration and avoiding incorrect configuration.

In another embodiment, the program further includes instructions for performing the following operations: before filling the AUTH payload field in the IKE AUTH message based on the signature information in the certificate, determining that both the communication device and the second device support a digital signature; and when both the communication device and the second device support the digital signature, filling the AUTH payload field in a digital signature manner, where a filling value of an algorithm identifier field in the AUTH payload field is distinguished encoding rules DER code of the object identifier.

In the foregoing technical solution, the communication device may automatically fill the AUTH payload field in the IKE AUTH message based on the signature information in the certificate and a signature filling manner supported by the communication device and the second device. The user does not need to perform configuration, thereby improving accuracy of the IKE AUTH message and avoiding incorrect configuration performed by the user.

In another embodiment, that the communication device determines that both the communication device and the second device support a digital signature includes: The communication device obtains second configuration information, where the second configuration information indicates that the communication device supports the digital signature. The communication device obtains an IKE SA message sent by the second device, where the IKE SA message indicates that the second device supports the digital signature. The second device is the responder of the authentication, and the IKE SA message sent by the second device is an IKE_SA_INIT response message.

According to a fourth aspect, a communication device is provided. The communication device includes a memory storing a program, and a processor in communication with the memory. The processor runs the program to enable the device to perform the following operations: parsing a certificate to obtain signature information in the certificate; filling an AUTH payload field in an Internet key exchange protocol IKE identity authentication AUTH message based on the signature information in the certificate, where signature information indicated by the AUTH payload field is the same as the signature information in the certificate; and sending the IKE AUTH message to a second device. The communication device is a responder of authentication, and the second device is an initiator of the authentication. The IKE AUTH message sent by the communication device is an IKE_AUTH response message. The AUTH payload field indicates a signature information type supported by the communication device in the authentication, and there is a mapping relationship between a filling value of the AUTH payload field and the signature information in the certificate.

In an embodiment, the signature information in the certificate includes a public key algorithm.

In another embodiment, the signature information in the certificate further includes at least one of a signature filling manner, a Hash algorithm, or an expansion algorithm.

In another embodiment, the signature information in the certificate includes an object identifier, where the object identifier is code of the signature information in the certificate.

In the foregoing technical solution, after parsing the certificate, the communication device may obtain the signature information in a plurality of forms from the certificate, thereby improving flexibility of obtaining the signature information by the communication device.

In another embodiment, the program further includes instructions for performing the following operation: Before parsing the certificate to obtain the signature information in the certificate, the communication device obtains first configuration information, where the first configuration information indicates a type of operation for an IKE using a certificate for authentication.

In another embodiment, the type of operation for IKE authentication using a certificate is general certificate signature authentication; or the type of operation for IKE authentication using a certificate is general asymmetric key algorithm authentication. When the type of operation for IKE authentication using a certificate is the general asymmetric key algorithm authentication, the first configuration information further indicates a source of signature information of the general asymmetric key algorithm authentication.

In the foregoing technical solution, the user only needs to set the first configuration information, and does not need to configure specific signature information in the IKE AUTH message, thereby simplifying user configuration and avoiding incorrect configuration.

In another embodiment, the program further includes instructions for performing the following operations: Before filling the AUTH payload field in the IKE AUTH message based on the signature information in the certificate, the communication device determines that both the communication device and the second device support a digital signature. When both the communication device and the second device support the digital signature, the communication device fills the AUTH payload field in a digital signature manner, where a filling value of an algorithm identifier field in the AUTH payload field is distinguished encoding rules DER code of the object identifier.

In the foregoing technical solution, the communication device may automatically fill the AUTH payload field in the IKE AUTH message based on the signature information in the certificate and a signature filling manner supported by the communication device and the second device. The user does not need to perform configuration, thereby improving accuracy of the IKE AUTH message and avoiding incorrect configuration performed by the user.

In another embodiment, that the communication device determines that both the communication device and the second device support the digital signature includes: The communication device obtains second configuration information, where the second configuration information indicates that the communication device supports the digital signature. The communication device obtains an IKE SA message sent by the second device, where the IKE SA message indicates that the second device supports the digital signature. The second device is the initiator of the authentication, and the IKE SA message sent by the second device is an IKE_SA_INIT request message.

According to a fifth aspect, a chip is provided. The chip includes a processor and a data interface. The processor reads, through the data interface, instructions stored in a memory, to perform the method according to the first aspect or any one of the embodiments of the first aspect.

According to a sixth aspect, a chip is provided. The chip includes a processor and a data interface. The processor reads, through the data interface, instructions stored in a memory, to perform the method according to the second aspect or any one of the embodiments of the second aspect.

According to a seventh aspect, a computer program product is provided. The computer program product includes computer program code. When the computer program code is run on a computer, the computer is enabled to perform the method according to the first aspect or any one of the embodiments of the first aspect.

According to an eighth aspect, a computer program product is provided. The computer program product includes computer program code. When the computer program code is run on a computer, the computer is enabled to perform the method according to the second aspect or any one of the embodiments of the second aspect.

According to a ninth aspect, a computer-readable storage medium is provided. The computer-readable storage medium stores computer program code. When the computer program code is run on a computer, the computer is enabled to perform the method according to the first aspect or any one of the embodiments of the first aspect.

According to a tenth aspect, a computer-readable storage medium is provided. The computer-readable storage medium stores computer program code. When the computer program code is run on a computer, the computer is enabled to perform the method according to the second aspect or any one of the embodiments of the second aspect.

DESCRIPTION OF EMBODIMENTS

Figure 1:
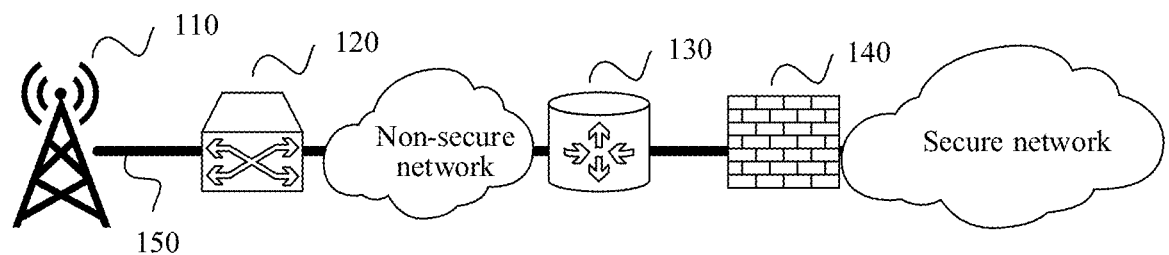
FIG. 1 is a schematic diagram of a network scenario according to an embodiment of this application.

The following clearly describes the technical solutions in embodiments of this application with reference to the accompanying drawings in embodiments of this application. It is clear that the described embodiments are some but not all of embodiments of this application.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may also be used.

In addition, in embodiments of this application, terms such as "for example" and "such as" are used to represent giving an example, an illustration, or description. Any embodiment or design scheme described as the "example" in this application should not be explained as being more preferred or having more advantages than another embodiment or design scheme. Exactly, the term "example" is used to present a concept in a specific manner.

A network architecture and a service scenario described in embodiments of this application are intended to describe technical solutions in embodiments of this application more clearly, and do not constitute a limitation on the technical solutions provided in embodiments of this application. A person of ordinary skill in the art may know that, with evolution of the network architecture and emergence of a new service scenario, the technical solutions provided in embodiments of this application are also applicable to similar technical problems.

Reference to "an embodiment", "some embodiments", or the like described in this specification indicates that one or more embodiments of this application include a specific feature, structure, or characteristic described with reference to embodiments. Therefore, in this specification, statements, such as "in an embodiment", "in some embodiments", "in some other embodiments", and "in other embodiments", that appear at different places do not necessarily mean referring to a same embodiment; instead, the statements mean referring to "one or more but not all of embodiments", unless otherwise specifically emphasized in other ways. The terms "include", "comprise", "have", and their variants all mean "include but are not limited to", unless otherwise specifically emphasized.

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof means any combination of these items, including any combination of singular items (pieces) or plural items (pieces). For example, at least one (piece) of a, b, or c may indicate: a, b, c, a and b, a and c, b and c, or a, b, and c, where a, b, and c may be singular or plural.

In a network connection, Internet Protocol Security (IPsec) may provide a secure communication tunnel and ensure connection security by encrypting the tunnel. The Internet key exchange protocol (IKE) can be used to assist the IPsec in security management. In a process of IPsec processing, the IKE can be used to: perform identity authentication on a device, and negotiate a security policy and exchange a session key. A method for identity authentication in embodiments of this application may be applied to various network scenarios. A device that supports Internet key exchange protocol version 2 (IKEv2) identity authentication and that has capabilities of signature calculation and authenticating using a certificate may perform identity authentication by applying a method for IKE authentication using a certificate according to embodiments of this application.

FIG. 1 is a schematic diagram of a network scenario according to an embodiment of this application. As shown in FIG. 1, a base station 110 accesses a secure network by using a switching device 120, a router 130, and a security gateway 140. An IPsec tunnel 150 is encrypted to ensure connection security. For two devices that directly communicate with each other on the IPsec tunnel, as long as the two devices support an IKEv2 protocol and have capabilities of signature calculation and authenticating a certificate, identity authentication may be performed by applying a method for IKE authentication using a certificate provided in embodiments of this application.

For example, the base station 110, the switching device 120, and the router 130 all support the IKEv2 protocol and have the capabilities of signature calculation and authenticating a certificate. In this case, when the base station 110 is in a communication connection to the switching device 120, security management may be performed by applying the method for IKE authentication using a certificate in embodiments of this application. When the switching device 120 is in a communication connection to the router 130, security management may also be performed by applying the method for IKE authentication using a certificate in embodiments of this application.

Figure 2:
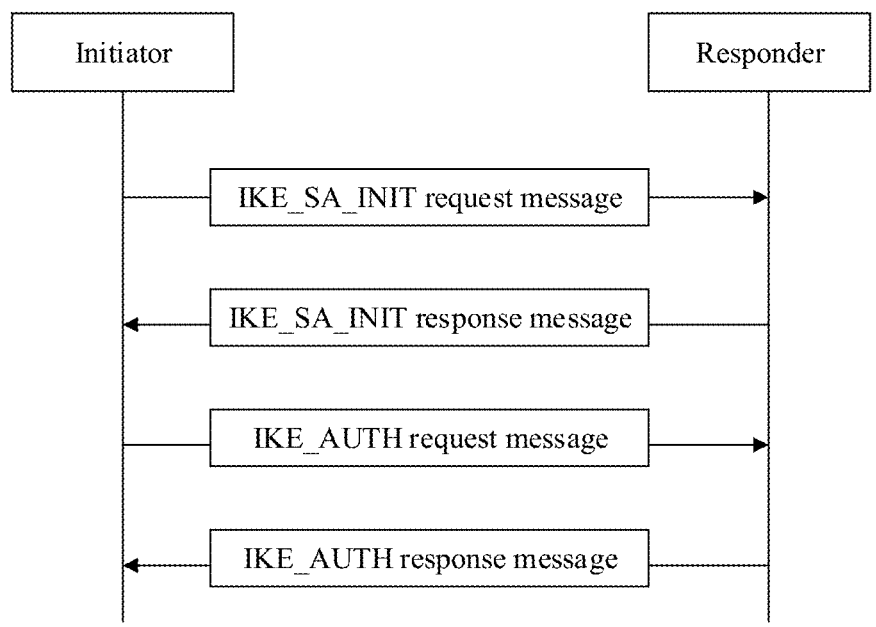
FIG. 2 is a schematic diagram of a message exchange process of IKEv2 authentication.

FIG. 2 is a schematic diagram of a message exchange process of IKEv2 authentication. As shown in FIG. 2, a process of IKEv2 authentication includes two phases.

Phase 1

An initiator of authentication and a responder of the authentication negotiate and exchange parameters required in the authentication by using a pair of IKE security association (SA) messages. The initiator sends an initial negotiation (IKE_SA_INIT) request message, and the responder sends an IKE_SA_INIT response message.

Phase 2

The initiator and the responder perform identity authentication by using a pair of IKE identity authentication (AUTH) messages. An IKE AUTH message of the initiator is referred to as an IKE_AUTH request message, and an IKE_AUTH message of the responder is referred to as an IKE AUTH response message.

The message exchange process of IKE authentication mainly includes: The initiator sends the IKE_SA_INIT request message to the responder, and the responder returns the IKE_SA_INIT response message. The initiator and the responder negotiate and exchange, based on the two messages, the parameters required in the authentication. Then, the initiator sends the IKE_AUTH request message to the responder, the responder returns the IKE_AUTH response message, and the identity authentication is completed.

In an existing authentication manner, signature information in the IKE AUTH message needs to be configured by a user. When IKE authentication configuration is performed, the user needs to first query signature information in a certificate of a device, and accurately record the signature information that is in the certificate. Then, the user needs to configure an authentication method based on the recorded signature information in the certificate and needs to ensure that the authentication method configured by the user corresponds to a signature algorithm in the certificate. For example, if a public key algorithm indicated by the signature information in the certificate is an Rivest-Shamir-Adleman algorithm (RSA), the authentication method configured by the user needs to match the RSA algorithm indicated by the certificate, in other words, an algorithm configured by the user also needs to be the RSA algorithm. In addition, some request for comments (RFC) files, for example, RFC 7427, extend the authentication method, and newly add a manner of a general "digital signature" authentication method. Therefore, the user further needs to determine whether a peer end supports the digital signature.

In the existing authentication manner, the user participates in a complex configuration process. The user needs to know how to query signature information in a certificate file, understand a meaning of a type of an algorithm, and be proficient in using configuration options of methods for IKE authentication corresponding to different types of signature information. All of the operations have high requirements on the user. In addition, to avoid incorrect configuration performed by the user, an additional design for foolproof is further required for an edge device such as a base station or a terminal.

Configuration of a current authentication method is complex. When there is a new type of a certificate, a new configuration interface, or new IKE protocol implementation, the configuration of the current authentication method needs to be added or modified, which is inconvenient for extension and further increases difficulty in applying the authentication method.

A method for IKE authentication using a certificate is provided in this application. A device may automatically parse signature information in a certificate, and fill a corresponding field of an IKE message with appropriate information. Therefore, user configuration is simplified and incorrect manual configuration is further reduced. In addition, because the device may automatically obtain the signature information from the certificate and fill the corresponding field of the IKE message, a user does not need to learn configuration commands of devices from different vendors, thereby improving product usability. Further, for a device with a high requirement on automation, for example, a network edge device, an additional design for foolproof and a configuration constraint can be reduced by applying the authentication method in this application.

The following describes in detail the method for authentication using a certificate in embodiments of this application with reference to FIG. 3 to FIG. 6.

Figure 3:
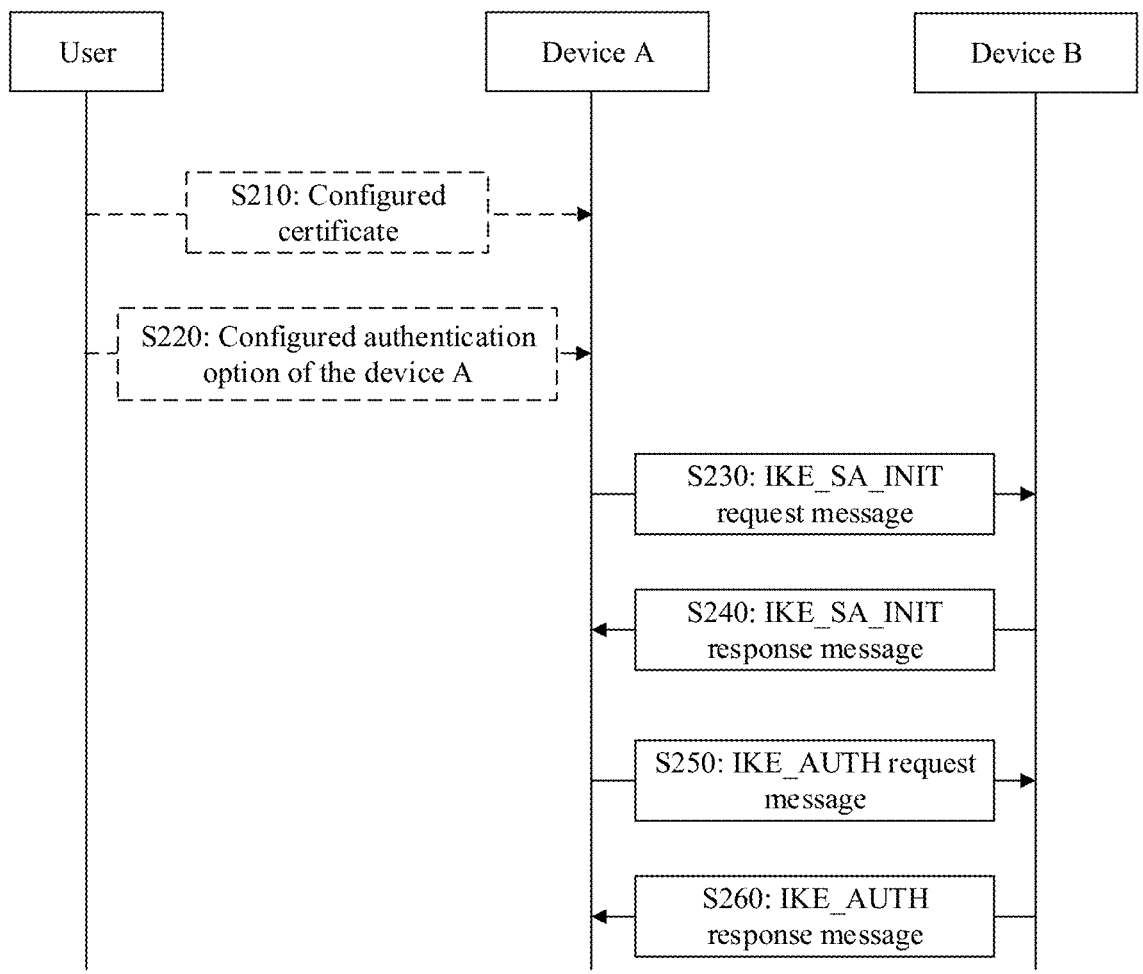
FIG. 3 is a schematic flowchart of a method for Internet key exchange protocol IKE authentication using a certificate according to an embodiment of this application.

FIG. 3 is a schematic flowchart of a method for IKE authentication using a certificate according to an embodiment of this application. It should be understood that, FIG. 3 shows operations of the method for IKE authentication using a certificate. However, the operations are merely examples. In this embodiment of this application, other operations or variations of the operations in FIG. 3 may be further performed.

The following describes in detail the method for authentication using a certificate in this embodiment of this application with reference to FIG. 3. An example in which a device A is an initiator and a device B is a responder is used.

Operation S210: The device A obtains a certificate configured by a user. The device A may store at least one certificate file. When the device A performs authentication with different responder devices, different certificates may be required. For example, the device A functions as the initiator of authentication and the device B functions as the responder of the authentication. When the authentication is performed, a certificate file required by the device A is a certificate A. In operation S210, the user may indicate, to the device A based on a command (CMD), a man-machine language (MML) command, or an application programming interface (API), through menu selection, or the like, that a certificate file corresponding to this authentication using a certificate is the certificate A in this case.

In some embodiments, the device A stores only one certificate file. As the initiator of the authentication, the device A uses the certificate file to perform the authentication with the device B by default. In this case, the user may not additionally configure the certificate file corresponding to this authentication using a certificate.

In some other embodiments, the device A stores at least one certificate file. As the initiator of the authentication, the device A uses the certificate A of the at least one certificate file to perform the authentication with the device B by default. In this case, the user may not additionally configure the certificate file corresponding to this authentication using a certificate either.

As described above, the user may not configure a certificate corresponding to this authentication using a certificate. Therefore, in some embodiments, the device A may not obtain the certificate configured by the user. In this case, the device A may consider, by default, that a certificate used in this authentication is the only certificate in the device A; or the device A may consider, by default, that the certificate used in this authentication is the certificate A of the at least one certificate file. In other words, in some cases, operation S210 may not be performed. In this case, the device A may determine that the certificate used in this authentication is the only certificate in the device A; or the device A may determine that the certificate used in this authentication is the certificate A by default.

Operation S220: The device A obtains an authentication option configured by the user. In this operation, the user may configure an authentication option of the device A based on a command, an MML command, or an API, through menu selection, or the like.

In an embodiment, the authentication option configured by the user may include first configuration information. The first configuration information is used to indicate an authentication method. The authentication method indicated by the first configuration information may be general certificate signature authentication or general asymmetric key algorithm authentication. If the first configuration information indicates that the authentication method is the general asymmetric key algorithm authentication, the first configuration information may further indicate a source of signature information of the general asymmetric key algorithm authentication. The source of the signature information of the general asymmetric key algorithm authentication may be a certificate, or may be another file other than a certificate file or another protocol.

For example, in a design of an option of the first configuration information, an interface of an option of the general certificate signature authentication may be named IKE_CERT_SIG or CERT SIG.

For example, in a design of an option of the first configuration information, an interface of an option of the general asymmetric key algorithm authentication may be named IKE_ASYM_ALG. In addition, the source of the signature information of the general asymmetric key algorithm authentication may be additionally specified in the option. In an embodiment, if the source of the signature information of the general asymmetric key algorithm authentication is not additionally specified, the source of the signature information may be considered, by default, as the certificate.

In an embodiment, if the authentication option obtained by the device A does not include the first configuration information, the device A may consider that a default authentication manner is the general certificate signature authentication.

In an embodiment, the authentication option configured by the user may include second configuration information, where the second configuration information indicates whether the device A supports a digital signature, for example, a digital signature specified in RFC 7427.

For example, in a design of an option of the second configuration information, an interface that is used to configure whether the device A supports the digital signature may be named DIG_SIG.

In some implementations, if the authentication option obtained by the device A does not include the second configuration information, the device A may consider, by default, that the device A supports the digital signature.

In some other implementations, if the authentication option obtained by the device A does not include the second configuration information, the device A may consider, by default, that the device A does not support the digital signature.

Figure 4:
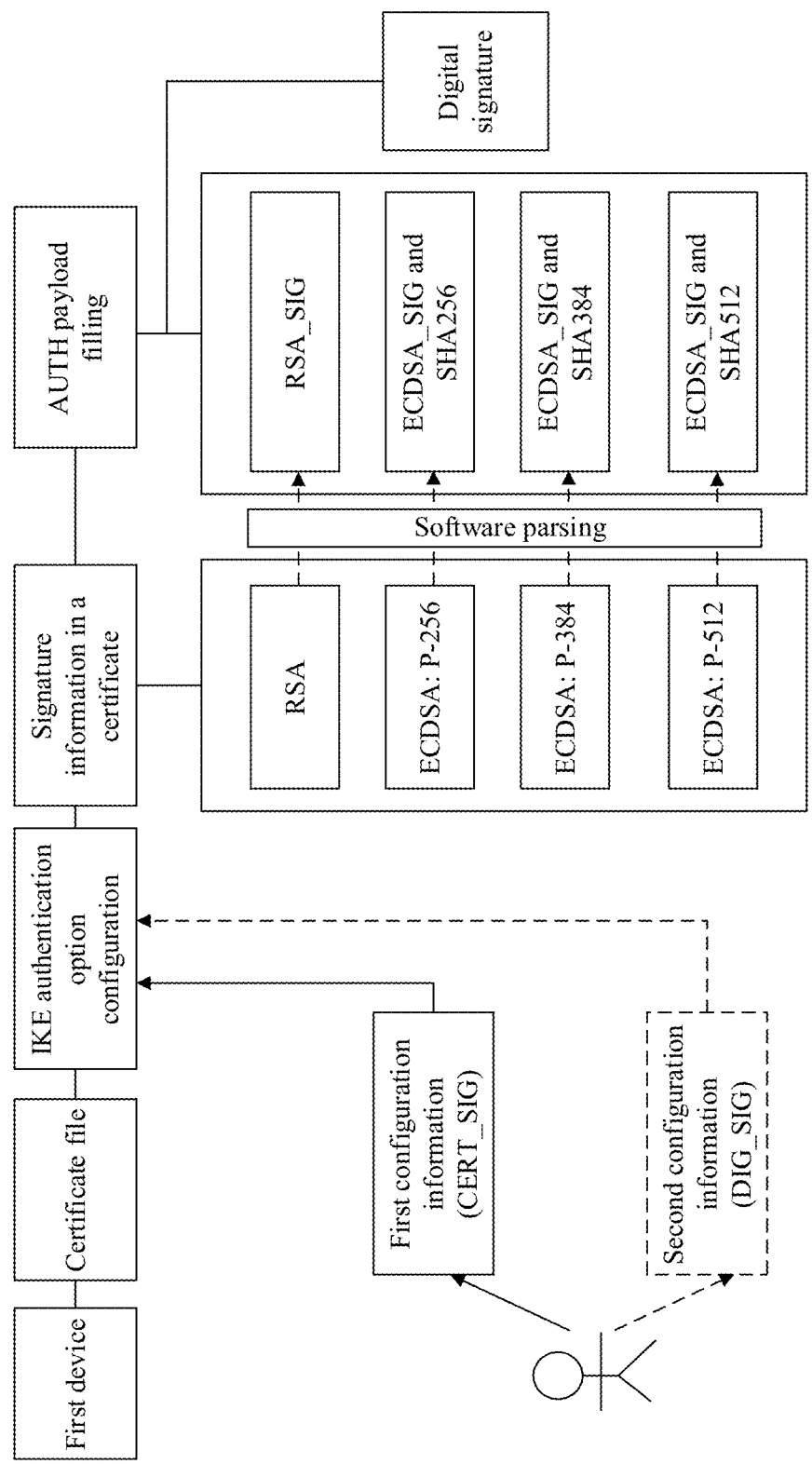
FIG. 4 is a schematic diagram of a user participating in IKE authentication configuration according to an embodiment of this application.

FIG. 4 is a schematic diagram of a user participating in IKE authentication configuration according to an embodiment of this application.

As shown in FIG. 4, the user configures the first configuration information through a CERT_SIG interface, where the first configuration information indicates that the authentication method of the device A is the general certificate signature authentication. The device A supports the digital signature by default. In this case, the user may not configure the second configuration information.

In some other embodiments, the user configures the first configuration information through an IKE_ASYM_ALG interface, where the first configuration information indicates that an authentication manner of the device A is the general asymmetric key algorithm authentication and that the source of the signature information is the certificate; and the user configures the second configuration information through a DIG_SIG interface, where the second configuration information indicates that the device A supports the digital signature.

In some other embodiments, the device A uses the general certificate signature authentication by default, and the device A supports the digital signature by default. In this case, the user may not configure the first configuration information and the second configuration information.

It should be understood that, according to the foregoing method for configuring an authentication option, user configuration shown in FIG. 4 and the foregoing embodiments of the user configuration are merely some embodiments, and another possible configuration combination is not described in detail herein again.

It should be further understood that, the user may further perform, on the device B, configuration operations similar to those described in operation S210 and operation S220, and details are not described herein again.

In some other embodiments, in a case in which the authentication method of the device A is the general certificate signature authentication, the device A may carry a certificate file in a certificate (CERT) payload field of the third packet of an IKE_AUTH request message. The device B may determine, based on the certificate file in the CERT payload field, that the authentication method of the device B is also the general certificate signature authentication.

As described above, an authentication option obtained by the device A may not include the first configuration information and/or the second configuration information. Therefore, in some embodiments, the device A may not obtain the authentication option configured by the user. In this case, the device A may consider, by default, that an authentication manner used by the device A is the general certificate signature authentication and that the device A supports the digital signature. In other words, in some cases, operation S220 may not be performed. In this case, the device A may determine that the authentication manner is the general certificate signature authentication and that the device A supports the digital signature.

As described above, in this embodiment of this application, operations S210 and S220 are optional operations. In another embodiment, one or both of operations S210 and S220 may exist. For example, before operation S230, operations S210 and S220 may exist, only operation S210 may exist, or only operation S220 may exist.

In the foregoing embodiments, the user only needs to perform simple authentication option configuration for the authentication option, and does not need to configure specific signature information. As described above, in a process of authentication, the user may configure the authentication manner based on a simple menu or option command. For example, the user may select, in the menu, that the authentication method is the general certificate signature authentication, and the user may select, in the menu, whether the device A supports the digital signature. However, in an existing certificate authentication technology, the user needs to configure, one by one based on complex computer instructions, the signature information required by the device A during authentication. In embodiments of this application, the user does not need to configure each type of signature information based on a complex command, and does not need to learn different command formats and configuration methods of devices of different vendors.

Operations S230 and S240 can show a message exchange process between the device A and the device B in a first phase of IKEv2 authentication. It should be understood that, manners of filling each field in an IKE_SA_INIT request message in operation S230 and an IKE_SA_INIT response message in operation S240 are the same as those in a conventional technology. Details are not described.

Operation S230: The device A sends the IKE_SA_INIT request message to the device B.

In some embodiments, in addition to an authentication-related parameter, the device A may further carry, in the IKE_SA_INIT request message, information for determining whether the device B supports the digital signature.

For example, when the second configuration information obtained by the device A indicates that the device A supports the digital signature, the device A carries SIGNATURE HASH ALGORITHMS information in the IKE_SA_INIT request message, to attempt to determine whether the device B supports the digital signature.

For another example, when the device A supports the digital signature by default, the device A carries SIGNATURE_HASH_ALGORITHMS information in the IKE_SA_INIT request message, to attempt to determine whether the device B supports the digital signature.

For another example, when the device A does not support the digital signature by default or the second configuration information obtained by the device A indicates that the device A does not support the digital signature, the device A may not carry SIGNATURE_HASH_ALGORITHMS information in the IKE SA request message.

Operation S240: The device A receives the IKE_SA_INIT response message sent by the device B.

In some embodiments, in addition to an authentication-related parameter, the device B may further carry, in the IKE_SA_INIT response message, information for indicating whether the device B supports the digital signature.

For example, when the device B supports the digital signature by default, the device B carries a notification of the SIGNATURE HASH ALGORITHMS information in the second packet of the IKE_SA_INIT response message, to notify the device A that the device B supports the digital signature.

For another example, when the device B does not support the digital signature by default, the device B does not carry a notification of the SIGNATURE_HASH_ALGORITHMS information in the second packet of the IKE_SA_INIT response message, to notify the device A that the device B does not support the digital signature.

In an embodiment, the device A may determine, depending on whether the notification of the SIGNATURE_HASH_ALGORITHMS information is included in the second packet of the IKE_SA_INIT response message, whether the device B supports the digital signature.

Operations S250 and S260 show a message exchange process between the device A and the device B in a second phase of the IKEv2 authentication.

Operation S250: The device A sends the IKE_AUTH request message to the device B.

Before sending the IKE_AUTH request message, the device A needs to fill an AUTH payload field in the IKE_AUTH request message.

As described above, in some embodiments, the device A may obtain the authentication option configured by the user. In this case, the device A may determine, based on the obtained authentication option, how to fill the AUTH payload field.

For example, if the authentication option obtained by the device A includes the first configuration information, and the first configuration information indicates that the authentication manner is the general certificate signature authentication, the device A may automatically parse signature information in the certificate, and fill the AUTH payload field based on the signature information.

For another example, if the authentication option obtained by the device A includes the first configuration information, and the first configuration information indicates that the authentication method is the general asymmetric key algorithm authentication and that the source of the signature information is the certificate, the device A may automatically parse the signature information in the certificate, and fill the AUTH payload field based on the signature information.

In some other embodiments, if the authentication option configured by the user does not include the first configuration information, or the user does not configure the authentication option, the device A may automatically parse signature information in the certificate, and fill the AUTH payload field based on the signature information.

Figure 5:
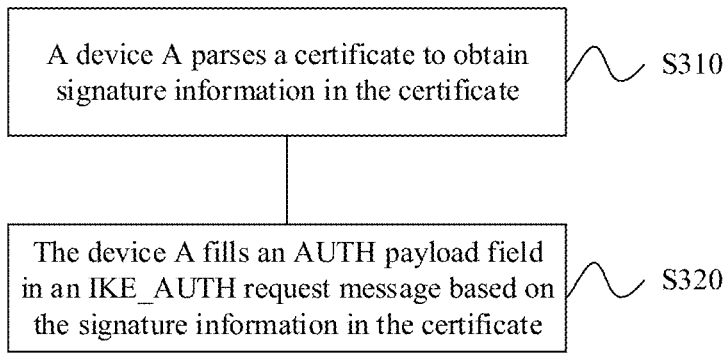
FIG. 5 is a schematic flowchart of filling an AUTH payload field according to an embodiment of this application.

The following describes in detail a procedure of filling the AUTH payload field with reference to FIG. 5.

FIG. 5 is a schematic flowchart of filling an AUTH payload field according to an embodiment of this application.

Operation S310: The device A parses the certificate to obtain the signature information in the certificate. Specifically, the device A may directly parse, by using software, signature information included in a certificate file, and the user does not need to query the signature information in the certificate. The device A may parse the signature information from a plurality of fields that include the signature information and that are in the certificate file.

For example, RFC 5280 defines a format of the signature information such as a key algorithm in the certificate file as follows.

```
Certificate ::= SEQUENCE {
    tbsCertificate       TBSCertificate,
    signatureAlgorithm   AlgorithmIdentifier,
    signatureValue       BIT STRING }
AlgorithmIdentifier ::= SEQUENCE {
    Algorithm            OBJECT IDENTIFIER,
    Parameters           ANY DEFINED BY algorithm OPTIONAL
    }
```

Certificate represents a certificate file; SEQUENCE represents organizing content in the certificate in sequence to form a target certificate; tbsCertificate (to be signed certificate) represents to-be-signed certificate content in the certificate; signatureAlgorithm represents a signature algorithm of the certificate; and signatureValue represents a signature value of the certificate, where the signature value is obtained by performing signature calculation on the content in the tbsCertificate according to the signature algorithm shown in signatureAlgorithm.

The signature algorithm indicated by the signatureAlgorithm field specifically further includes an algorithm and other parameters that can be defined.

For example, if the signature information in the certificate is RSA With SHA-1, content of the signatureAlgorithm in the foregoing fields in the certificate is as follows:

```
sa-rsaWithSHA1 SIGNATURE-ALGORITHM ::= {
    IDENTIFIER sha1WithRSAEncryption
```

-continued

```
    PARAMS TYPE NULL ARE required
    HASHES { mda-sha1 }
    PUBLIC-KEYS { pk-rsa}
    SMINE-CAPS {IDENTIFIED BY sha1WithRSAEncryption }
}
sha1WithRSAEncryption OBJECT IDENTIFIER :: = {
    iso (1) member-body (2) us (840) rsadsi (113549) pkcs (1)
    pkcs-1 (1) 5
}
```

The device A parses "IDENTIFIER" in the signatureAlgorithm field to learn that an expansion algorithm is sha1WithRSAEncryption; the device A parses "HASHES" in the signatureAlgorithm field to learn that a hash algorithm is sha1; the device A parses "PUBLIC-KEYS" in the signatureAlgorithm field to learn that a public key algorithm is RSA; and the device A parses "sha1WithRSAEncryption OBJECT IDENTIFIER" in the signatureAlgorithm field to learn that an object identifier is "iso (1) member-body (2) us (840) rsadsi (113549) pkcs (1) pkcs-1 (1) 5".

In addition, the device A may further parse a Signature field and a subjectPublicKeyInfo field in the TBSCertificate field in the certificate to obtain the foregoing signature information. This is not limited in this embodiment of this application.

Operation S320: The device A fills the AUTH payload field in the IKE AUTH request message based on the signature information in the certificate, where signature information indicated by the AUTH payload field matches the signature information in the certificate.

Specifically, the AUTH payload field may be filled in two manners: a non-digital signature manner and a digital signature manner. In the non-digital signature manner, a filling value of an identity authentication method (AUTH method) field in the AUTH payload field indicates the signature information in the AUTH payload. Therefore, the filling value of the AUTH method field needs to match the signature information in the certificate. In the digital signature manner, a filling value of an algorithm identifier (AlgorithmIdentifier ASN.1 object) field in the AUTH payload field indicates the signature information in the AUTH payload. Therefore, the filling value of the AlgorithmIdentifier ASN.1 object field needs to match the signature information in the certificate.

With reference to Table 1 and Table 2, the following separately describes manners of filling the AUTH payload field in the non-digital signature manner and the digital signature manner.

Table 1 is a mapping relationship between a filling value of an AUTH payload field and signature information in a certificate in a non-digital signature manner. In an embodiment, the device A may determine the filling value of the AUTH method field according to a public key algorithm and at least one of a signature filling manner, a Hash algorithm, or an expansion algorithm that are included in the signature information.

TABLE 1

| Signature information in a certificate of a device | | | | Filling value of an AUTH payload field |
|---|---|---|---|---|
| Public key algorithm | Signature filling manner | Hash algorithm | Expansion algorithm | Non-digital signature AUTH method field |
| RSA | RSASSA-PKCS1-v1_5 | sha1 | sha1WithRSAEncryption | 1 |
| | | sha256 | sha256WithRSAEncryption | 1 |
| | | sha384 | sha384WithRSAEncryption | 1 |
| | | SHA512 | sha512WithRSAEncryption | 1 |
| | RSASSA-PSS | Empty parameters | RSASSA-PSS with Empty Parameters | 1 |
| | | sha1 | RSASSA-PSS with Default Parameters | 1 |
| | | sha256 | RSASSA-PSS with SHA-256 | 1 |
| | | sha384 | RSASSA-PSS with SHA-384 | 1 |
| | | SHA512 | RSASSA-PSS with SHA-512 | 1 |
| ECDSA | ECDSA | sha1 | ecdsa-with-sha1 | NA |
| | | sha256 | ecdsa-with-sha256 | 9 |
| | | sha384 | ecdsa-with-sha384 | 10 |
| | | SHA512 | ecdsa-with-sha512 | 11 |
| EdDSA | Ed25519 | — | ED25519 | NA |

"—" in Table 1 indicates that when the public key algorithm is EdDSA, the hash algorithm is not required.
"NA" in Table 1 indicates that the AUTH method is not available (NA).

In some embodiments, the device A may determine the filling value of the AUTH method field according to the public key algorithm. For example, when the public key algorithm is RSA algorithm, the device A may determine the filling value of the AUTH method field is 1.

In some embodiments, the device A may determine the filling value of the AUTH method field according to the public key algorithm and the expansion algorithm. For example, when the public key algorithm is ECDSA, and the expansion algorithm is ecdsa-with-sha256, the device A may determine the filling value of the AUTH method field is 9.

In some embodiments, the device A may determine the filling value of the AUTH method field according to the public key algorithm, the Hash algorithm, and the signature filling manner. For example, when the public key algorithm is ECDSA, the Hash algorithm is sha384, and the signature filling manner is ECDSA, the device A may determine the filling value of the AUTH method field is 10.

In some embodiments, the device A may determine the filling value of the AUTH method field according to the public key algorithm, the signature filling manner, the Hash algorithm, and the expansion algorithm. For example, when the public key algorithm is ECDSA, the signature filling manner is ECDSA, the Hash algorithm is SHA512, and the expansion algorithm is ecdsa-with-sha512, the device A may determine the filling value of the AUTH method field is 11.

In an embodiment, when the device A determines that at least one of the device A and the device B does not support a digital signature, the device A fills the AUTH payload field in the non-digital signature manner.

For example, the device A obtains the second configuration information in the authentication option configured by the user and determines that the device A supports the digital signature, and the device A receives the IKE_SA_INIT response message from the device B, where the IKE_SA_INIT response message does not include the notification of the SIGNATURE_HASH_ALGORITHMS information. In this case, the device A determines that at least one of the two devices does not support the digital signature, and the device A fills the AUTH payload field in the non-digital signature manner.

For another example, the device A does not support the digital signature by default. Therefore, the device A determines that at least one of the device A and the device B does not support the digital signature, and the device A fills the AUTH payload field in the non-digital signature manner.

Table 2 is a mapping relationship between a filling value of an AUTH payload field and signature information in a certificate in the digital signature manner. In an embodiment, the device A may determine the filling value of the AlgorithmIdentifier ASN.1 object field in the AUTH payload field based on the object identifier included in the signature information of the certificate. The object identifier included in the signature information of the certificate is code corresponding to the public key algorithm, the signature filling manner, the Hash algorithm, and the expansion algorithm that are in the signature information of the certificate. An object identifier is widely used in a public key algorithm standard, and may indicate signature information included in a certificate. The signature information in the certificate has a corresponding object identifier. For example, RFC 5280 or RFC 5912 specifies a mapping relationship between signature information in a certificate and an object identifier.

For example, in the digital signature manner, filling values of the AUTH method field in the AUTH payload field are all 14. The filling value of the AlgorithmIdentifier ASN.1 object field is content obtained by encoding the object identifier and a related parameter in the certificate by using distinguishable encoding rules (DERs).

TABLE 2

| Signature information in the certificate of the device | | | | Filling value of the AUTH payload field Digital signature | |
|---|---|---|---|---|---|
| Public key algorithm | Signature filling manner | Hash algorithm | Expansion algorithm | AUTH method field | AlgorithmIdentifier ASN. 1 object field |
| RSA | RSASSA-PKCS1-v1_5 | sha1 | sha1WithRSAEncryption | 14 | 300d 0609 2a86 4886 f70d 0101 0505 00 |
| | | sha256 | sha256WithRSAEncryption | 14 | . . . |
| | | sha384 | sha384WithRSAEncryption | 14 | . . . |
| | | SHA512 | sha512WithRSAEncryption | 14 | . . . |
| | RSASSA-PSS | Empty parameters | RSASSA-PSS with Empty Parameters | 14 | 300d 0609 2a86 4886 f70d 0101 0a30 00 |
| | | sha1 | RSASSA-PSS with Default Parameters | 14 | . . . |
| | | sha256 | RSASSA-PSS with SHA-256 | 14 | . . . |
| | | sha384 | RSASSA-PSS with SHA-384 | 14 | . . . |
| | | SHA512 | RSASSA-PSS with SHA-512 | 14 | . . . |
| ECDSA | ECDSA | sha1 | ecdsa-with-sha1 | 14 | 3009 0607 2a86 48ce 3d04 01 |
| | | sha256 | ecdsa-with-sha256 | 14 | 300a 0608 2a86 48ce 3d04 0302 |
| | | sha384 | ecdsa-with-sha384 | 14 | 300a 0608 2a86 48ce 3d04 0303 |
| | | SHA512 | ecdsa-with-sha512 | 14 | 300a 0608 2a86 48ce 3d04 0304 |
| EdDSA | Ed25519 | — | ED25519 | 14 | . . . |

"—" in Table 2 indicates that when the public key algorithm is EdDSA, the hash algorithm is not required.

For example, in an embodiment of the foregoing operation S310, when the signature information in the certificate is RSA With sha-1, by parsing "sha1WithRSAEncryption OBJECT IDENTIFIER" of the signatureAlgorithm field in the certificate file, the device A may learn that an object identifier indicated by an abstract syntax notation one (abstract syntax notation one, ASN.1) is "iso (1) member-body (2) us (840) rsadsi (113549) pkcs (1) pkcs-1 (1) 5". The object identifier is "1.2.840.113549.115" in dot-decimal notation. By decoding the object identifier, the device A may learn that the signature information in the certificate is RSA With sha-1 and that the related parameter required in RFC 3279 is an empty parameter.

As shown in Table 2, when the signature information in the certificate is RSA With sha-1, the filling value of the AlgorithmIdentifier ASN.1 object field is 300d 0609 2a86 4886 f70d 0101 0505 00. Each byte of the filling value is a hexadecimal number. The meaning of each byte is as follows.

The first byte "30" is a tag, indicating that the following content is a sequence, and is ASN.1 code of the object identifier and ASN.1 code of the related parameter in sequence.

The second byte "0d" is a length, indicating that a length of the following content is 13 bytes.

The third byte "06" is a tag, indicating the object identifier.

The fourth byte "09" is a length, indicating that a length of the following content is nine bytes. The third byte and the fourth byte together indicate that a length of an encoded object identifier of the signature information RSA With sha-1 is nine bytes.

The fifth byte to the 13th byte "2a86 4886 f70d 0101 05" are DER code of the object identifier of the signature information RSA With sha-1.

The 14th byte "05" is a tag, indicating null (NULL), which indicates that the signature information RSA With sha-1 does not have any related parameter.

The 15th byte "00" is a length, indicating that a length of the following content is 0 bytes, in other words, parameter content is empty and there is no parameter.

It should be understood that, in Table 2, for an object identifier of each type of signature information, the filling value of the AlgorithmIdentifier ASN.1 object field may be generated according to the foregoing DER encoding rules. To show the mapping relationship between the filling value of the AlgorithmIdentifier ASN.1 object field and the signature information in the certificate more concisely, " . . . " is used to omit some filling values of the AlgorithmIdentifier ASN.1 object field.

In an embodiment, when the device A determines that both the device A and the device B support the digital signature, the device A fills the AUTH payload field in the digital signature manner.

For example, the device A obtains the second configuration information in the authentication option configured by the user and determines that the device A supports the digital signature, and the device A receives the IKE_SA_INIT response message from the device B, where the second packet of the IKE_SA_INIT response message includes the notification of the SIGNATURE_HASH_ALGORITHMS information. In this case, the device A determines that both devices support the digital signature, and the device A fills the AUTH payload field in the digital signature manner.

For another example, the device A supports the digital signature by default, and the device A receives the IKE_SA_INIT response message from the device B, where the second packet of the IKE_SA_INIT response message includes the notification of the SIGNATURE_HASH_ALGORITHMS information. In this case, the device A determines that both devices support the digital signature, and the device A fills the AUTH payload field in the digital signature manner.

It should be understood that, in this embodiment of this application, regardless of the non-digital signature manner or the digital signature manner, a filling manner of another field in an IKE AUTH message other than the AUTH method field and the AlgorithmIdentifier ASN.1 object field in the AUTH payload field is the same as an existing filling manner. Details are not described herein.

As described above, according to the method for authentication using a certificate in some embodiments of this application, the device A may obtain the authentication option configured by the user, to determine to parse the signature information in the certificate. In addition, the device A may determine a filling manner of the AUTH payload by obtaining configuration information of the user. In this case, device A may automatically parse the signature information in the certificate and automatically fill a corresponding field in the AUTH payload based on the mapping relationship between the signature information in the certificate and the filling value in the AUTH payload. However, in an existing authentication method, the user needs to query the signature information in the certificate, and then configure the filling value of the AUTH payload based on the signature information in the certificate. In addition, the user needs to ensure that signature information corresponding to the filling value of the AUTH payload configured by the user matches the signature information in the certificate, which imposes a high requirement on the user.

Operation S260: The device A receives an IKE AUTH response message sent by the device B.

In this operation, similar to the device A, the device B also needs to construct an IKE AUTH message. In this embodiment, the device B is the responder of the authentication. Therefore, the device B needs to construct the IKE_AUTH response message, and the IKE_AUTH response message sent by the device B and the IKE_AUTH request message sent by the device A have a similar structure. Therefore, similar to the device A, the device B may also fill an AUTH payload in the IKE_AUTH response message according to the method described in operation S250. Details are not described herein again.

It should be understood that, a filling manner of another field in the IKE AUTH response message other than the AUTH method field and the AlgorithmIdentifier ASN.1 object field is the same as the existing filling manner.

After receiving the IKE AUTH response message, the device A checks whether signature information carried in the response message is consistent with signature information of a certificate file in the response message. If the signature information carried in the response message and the signature information of the certificate file in the response message are inconsistent, the device A considers that the authentication fails. If the signature information carried in the response message and the signature information of the certificate file in the response message are consistent, the device A continues the authentication.

The foregoing describes a process of authentication using a certificate by using an example in which the device A is the initiator and the device B is the responder. It should be understood that the device B may also serve as an initiator, and the device A may also serve as a responder. In this case, the device A and the device B may still complete the authentication using a certificate by performing a process similar to the foregoing operations. Details are not described herein again.

Figure 6:
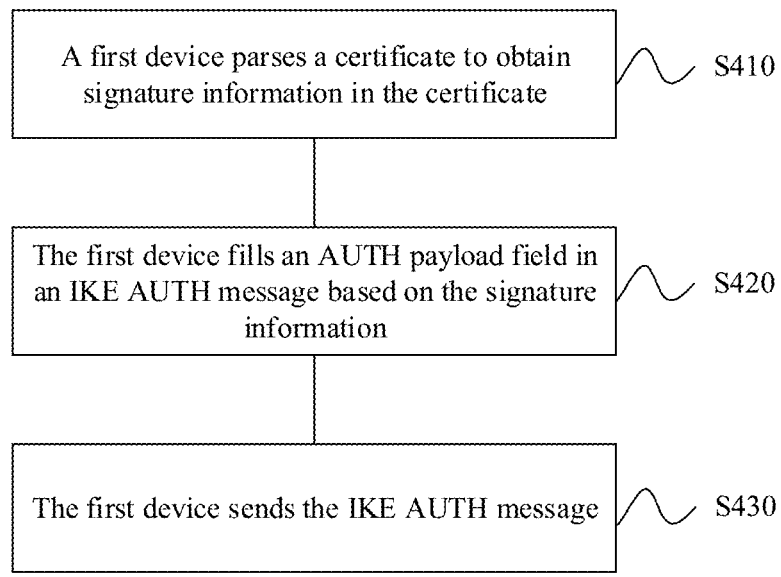
FIG. 6 is a schematic flowchart of a method for IKE authentication using a certificate according to another embodiment of this application.

FIG. 6 is a schematic flowchart of a method 400 for IKE authentication using a certificate according to another embodiment of this application.

Operation S410: A first device parses a certificate to obtain signature information in the certificate. The first device may obtain the signature information in the certificate according to the method described in operation S310 in the method 300 shown in FIG. 5. Details are not described again.

Operation S420: The first device fills an AUTH payload field in an IKE AUTH message based on the signature information in the certificate. The method 400 may be used to implement the method 200. When the first device is an initiator of authentication, the first device is equivalent to the device A in the method 200. Correspondingly, the IKE AUTH message filled by the first device is equivalent to the IKE_AUTH request message in the method 200. Therefore, the first device may fill the AUTH payload field in the IKE AUTH request message according to the method described in operation S250 in the method 200.

When the first device is a responder of authentication, the first device is equivalent to the device B in the method 200. Correspondingly, the IKE AUTH message filled by the first device is equivalent to the IKE_AUTH response message in the method 200. Therefore, the first device may fill the AUTH payload field in the IKE_AUTH response message according to the method described in operation S260 in the method 200.

Operation S430: The first device sends the IKE AUTH message.

When the first device is an initiator of authentication, the first device is equivalent to the device A in the method 200. In this case, the first device sends a filled IKE_AUTH request message.

When the first device is a responder of authentication, the first device is equivalent to the device B in the method 200. In this case, the first device sends a filled IKE_AUTH response message.

According to the method for authentication using a certificate in embodiments of this application, a user configuration process is simplified, and incorrect user configuration is avoided. In addition, because specific signature information does not need to be configured, devices of different vendors may use the same or similar configuration interfaces, and a user does not need to learn complex configuration commands of different vendors, thereby improving product usability and lowering a requirement on the user.

In addition, in embodiments of this application, after the first device uses the configuration information of the user to: apply general certificate signature authentication, or apply asymmetric key algorithm authentication and determine that a source of the signature information is the certificate, the first device may automatically obtain the signature information from the certificate file. The first device may further automatically fills the AUTH payload field in the IKE AUTH message based on the signature information obtained from the certificate. The user does not need to configure the filling value of the AUTH payload field, thereby avoiding incorrect configuration performed by the user and improving accuracy of the IKE AUTH message.

Figure 7:
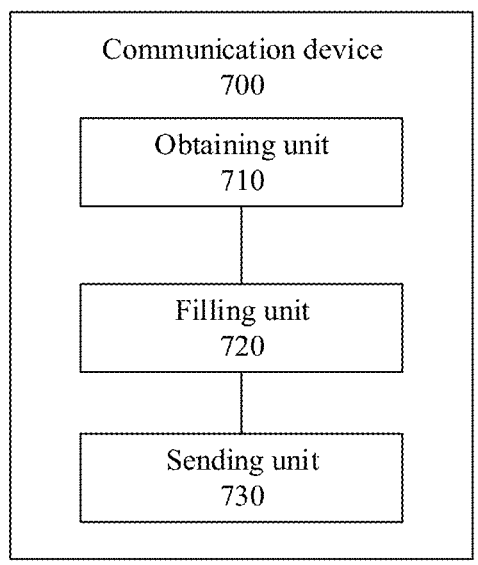
FIG. 7 is a schematic diagram of a structure of a communication device provided in an embodiment of this application.

FIG. 7 is a schematic diagram of a structure of a communication device provided in an embodiment of this application. The communication device is configured to implement the method 200 or the method 400. For example, the communication device may be the device A or the device B in the method 200, or may be the first device in the method 400, or may be a component (for example, a chip or a circuit)

that can be used in the device A, the device B, or the first device in the foregoing methods. As shown in FIG. 7, the communication device 700 may include an obtaining unit 710, a filling unit 720 and a sending unit 730.

The obtaining unit 710 is configured to parse a certificate to obtain signature information in the certificate.

The filling unit 720 is configured to fill an AUTH payload field in an IKE AUTH message based on the signature information in the certificate, where signature information indicated by the AUTH payload field is the same as the signature information in the certificate.

The sending unit 730 is configured to send the IKE AUTH message to a second device.

In an embodiment, the obtaining unit 710 and the filling unit 720 may be implemented by a processor, and the sending unit 730 may be implemented by a transmitter. For specific functions and beneficial effects of the obtaining unit 710, the filling unit 720 and the sending unit 730, refer to the descriptions in the foregoing methods. For brevity, details are not described herein again.

Figure 8:
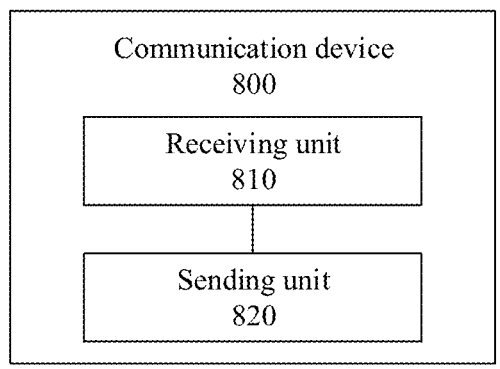
FIG. 8 is a schematic diagram of a structure of a communication device provided in an embodiment of this application.

FIG. 8 is a schematic diagram of a structure of a communication device provided in an embodiment of this application. The communication device is configured to implement the method 200 or the method 400 described above. For example, the communication device may be the device B in the method 200, to perform operations performed by the device B in the method 200; or the communication device may be the second device in the method 400 or a component (for example, a chip or a circuit) that can be used in the second device in the foregoing method, to perform operations performed by the second device. As shown in FIG. 8, the communication device 800 may include a receiving unit 810 and a sending unit 820.

The receiving unit 810 is configured to receive an IKE AUTH message sent by a first device.

The sending unit 820 is configured to send an IKE SA message to the first device, where the IKE SA message indicates that the communication device supports a digital signature.

In an embodiment, the receiving unit 810 may be implemented by a receiver, and the sending unit 820 may be implemented by a transmitter. For specific functions and beneficial effects of the receiving unit 810 and the sending unit 820, refer to the descriptions in the foregoing methods. For brevity, details are not described herein again.

Figure 9:
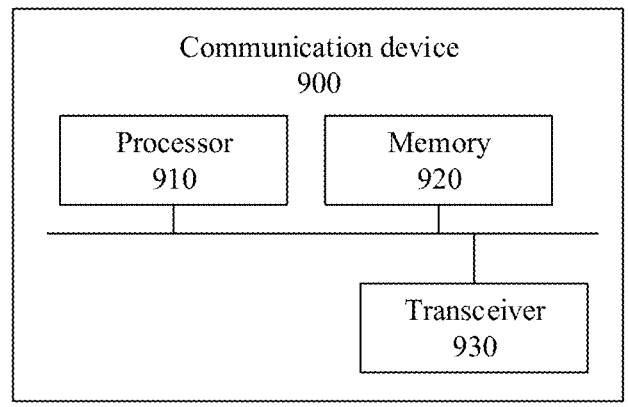
FIG. 9 is a schematic diagram of a structure of a communication device provided in an embodiment of this application.

FIG. 9 is a schematic diagram of a structure of a communication device provided in an embodiment of this application. As shown in FIG. 9, the communication device 900 includes a processor 910, a memory 920, and a transceiver 930. The processor 910 may be configured to: process a protocol of authentication using a certificate and authentication data, control the communication device, execute a software program, process data of the software program, and the like. The memory 920 is mainly configured to store the software program and the data. The transceiver 930 is configured to receive information sent by another device (for example, a second device) or send information to another device.

For ease of description, FIG. 9 shows only one memory and one processor. In an actual communications device product, there may be one or more processors and one or more memories. The memory may also be referred to as a storage medium, a storage device, or the like. The memory may be disposed independently of the processor, or may be integrated with the processor. This is not limited in this embodiment of this application.

The transceiver may also be referred to as a transceiver unit, a transceiver, a transceiver apparatus, or the like. The processing unit may also be referred to as a processor, a processing board, a processing module, a processing apparatus, or the like. A component that is in the transceiver 930 and that is configured to implement a receiving function may be considered as a receiving unit, and a component that is in the transceiver 930 and that is configured to implement a sending function may be considered as a sending unit. In other words, the transceiver 930 includes the receiving unit and the sending unit. The receiving unit may also be sometimes referred to as a receiver, a receiver machine, a receiver circuit, or the like. The sending unit sometimes may also be referred to as a transmitter, a transmitter machine, a transmitter circuit, or the like.

The processor 910, the memory 920, and the transceiver 930 communicate with each other through an internal connection path, to transmit a control signal and/or a data signal.

The methods disclosed in embodiments of this application may be applied to the processor 910, or may be implemented by the processor 910. The processor 910 may be an integrated circuit chip with a signal processing capability. In an implementation process, each operation of the foregoing methods may be implemented by a hardware integrated logic circuit in the processor 910 or by instructions in a software form.

The foregoing processor in embodiments of this application may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, operations, and logical block diagrams that are disclosed in embodiments of this application. The general-purpose processor may be a microprocessor, or the processor may be any conventional processor or the like. The operations of the methods disclosed with reference to embodiments of this application may be directly performed and completed by a hardware decoding processor, or may be performed and completed by using a combination of hardware and software modules in the decoding processor. The software module may be located in a mature computer-readable storage medium in the art, for example, a random access memory (RAM), a flash memory, a read-only memory (ROM), a programmable read-only memory, an electrically erasable programmable memory, a register, or the like. The computer-readable storage medium is located in the memory, and the processor reads instructions in the memory, and completes the operations of the foregoing methods in combination with hardware of the processor.

In some embodiments, the memory 920 may store instructions of the methods executed by the device A and/or the first device according to the method shown in FIG. 3 and/or the method shown in FIG. 5. The processor 910 may execute the instructions stored in the memory 920, to complete, in combination with other hardware (for example, the transceiver 930), the operations performed by the first device in the corresponding method. For a specific working process and beneficial effects, refer to the descriptions in the foregoing embodiments.

In some embodiments, the memory 920 may store instructions of the methods executed by the device B and/or the second device according to the method shown in FIG. 3 and/or the method shown in FIG. 5. The processor 910 may execute the instructions stored in the memory 920, to complete, in combination with other hardware (for example, the transceiver 930), the operations performed by the second device in the corresponding method. For a specific working process and beneficial effects, refer to the descriptions in the foregoing embodiments.

In some embodiments, the memory 920 may store instructions of the method executed by the device A and the device B according to the method shown in FIG. 3. The processor 910 may execute the instructions stored in the memory 920, to complete, in combination with other hardware (for example, the transceiver 930), the operations performed by the device A or the device B in the corresponding method. For a specific working process and beneficial effects, refer to the descriptions in the foregoing embodiments.

An embodiment of this application further provides a chip, and the chip includes a transceiver unit and a processing unit. The transceiver unit may be an input/output circuit or a communication interface. The processing unit is a processor integrated on the chip, a microprocessor integrated on the chip, or an integrated circuit integrated on the chip. The chip may perform the method of the device A and/or the method of the first device in the foregoing method embodiments.

An embodiment of this application further provides a chip, and the chip includes a transceiver unit and a processing unit. The transceiver unit may be an input/output circuit or a communication interface. The processing unit is a processor integrated on the chip, a microprocessor integrated on the chip, or an integrated circuit integrated on the chip. The chip may perform the method performed by the device B and/or the method performed by the second device in the foregoing embodiments.

An embodiment of this application further provides a computer-readable storage medium. The computer-readable storage medium stores instructions. When the instructions are executed, the method of the device A and/or the method of the first device in the foregoing method embodiments are/is performed.

In another form of this embodiment, a computer-readable storage medium is provided. The computer-readable storage medium stores instructions. When the instructions are executed, the method of the device B and/or the method of the second device in the foregoing method embodiments are/is performed.

An embodiment of this application further includes a computer program product including instructions. When the instructions are executed, the method of the device A and/or the method of the first device in the foregoing method embodiments are/is performed.

In another form of this embodiment, a computer program product including instructions is provided. When the instructions are executed, the method of the device B and/or the method of the second device in the foregoing method embodiments are/is performed.

A person of ordinary skill in the art may be aware that, units and algorithm operations in the examples described with reference to embodiments disclosed in this specification can be implemented by electronic hardware or a combination of computer software and electronic hardware. Whether functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing apparatuses and units, refer to a corresponding process in the foregoing method embodiments. Details are not described herein again.

In the several embodiments provided in this application, it should be understood that the disclosed apparatuses and methods may be implemented in other manners. For example, the described apparatus embodiments are merely examples. For example, module division is merely logical function division and may be other division in an actual implementation.

When a method provided by embodiments of this application is implemented in a form of a software functional unit and sold or used as an independent product, the method may be stored in a computer-readable storage medium. Based on such an understanding, the technical solutions of this application or some of the technical solutions may be implemented in a form of a software product. The computer software product is stored in a storage medium, and includes several instructions for instructing a computer device (which may be a personal computer, a server, a network device, or the like) to perform all or some of the operations of the methods described in embodiments of this application. The storage medium includes at least any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for Internet key exchange protocol (IKE) authentication using a certificate, comprising:
   parsing, by a first device, a certificate to obtain signature information in the certificate;
   filling, by the first device, an AUTH payload field in an Internet key exchange protocol (IKE) identity authentication (AUTH) message based on the signature information in the certificate, wherein signature information indicated by the AUTH payload field matches the signature information in the certificate; and
   sending, by the first device, the IKE AUTH message to a second device.

2. The method according to claim 1, wherein the signature information in the certificate comprises a public key algorithm.

3. The method according to claim 2, wherein the signature information in the certificate further comprises at least one of a signature filling manner, a Hash algorithm, or an expansion algorithm.

4. The method according to claim 2, wherein the signature information in the certificate comprises an object identifier, wherein the object identifier is code of the signature information in the certificate.

5. The method according to claim 2, further comprising:
   before filling the AUTH payload field in the IKE AUTH message based on the signature information in the certificate, determining, by the first device, that both the first device and the second device support a digital signature; and
   when both the first device and the second device support the digital signature, filling the AUTH payload field in a digital signature manner, wherein a filling value of an algorithm identifier field in the AUTH payload field is DER code of an object identifier.

6. The method according to claim 1, further comprising:
before parsing the certificate to obtain the signature information in the certificate, obtaining, by the first device, first configuration information, wherein the first configuration information indicates a type of operation for IKE authentication using a certificate.

7. The method according to claim 6, wherein
the type of operation for IKE authentication using a certificate is general certificate signature authentication; or
the type of operation for IKE authentication using a certificate is general asymmetric key algorithm authentication; and
when the type of operation for IKE authentication using a certificate is the general asymmetric key algorithm authentication, the first configuration information further indicates a source of signature information of the general asymmetric key algorithm authentication.

8. The method according to claim 1, further comprising:
before filling the AUTH payload field in the IKE AUTH message based on the signature information in the certificate, determining, by the first device, that both the first device and the second device support a digital signature; and
when both the first device and the second device support the digital signature, filling the AUTH payload field in a digital signature manner, wherein a filling value of an algorithm identifier field in the AUTH payload field is distinguished encoding rules (DER) code of an object identifier.

9. The method according to claim 8, wherein the determining, by the first device, that both the first device and the second device support a digital signature comprises:
obtaining, by the first device, second configuration information, wherein the second configuration information indicates that the first device supports the digital signature; and
obtaining, by the first device, an IKE security association (SA) message sent by the second device, wherein the IKE SA message indicates that the second device supports the digital signature.

10. A communication device, comprising:
a memory, storing a program; and
a processor in communication with the memory, wherein the processor executes the program to enable the device to perform the following operations:
parsing a certificate to obtain signature information in the certificate;
filling an AUTH payload field in an Internet key exchange protocol (IKE) identity authentication (AUTH) message based on the signature information in the certificate, wherein signature information indicated by the AUTH payload field matches the signature information in the certificate; and
sending the IKE AUTH message to a second device.

11. The communication device according to claim 10, wherein the signature information in the certificate comprises a public key algorithm.

12. The communication device according to claim 11, wherein the signature information in the certificate further comprises at least one of a signature filling manner, a Hash algorithm, or an expansion algorithm.

13. The communication device according to claim 11, wherein the program further comprises instructions for performing the following operations:
before filling the AUTH payload field in the IKE AUTH message based on the signature information in the certificate, determining that both the communication device and the second device support a digital signature; and
when both the communication device and the second device support the digital signature, filling the AUTH payload field in a digital signature manner, wherein a filling value of an algorithm identifier field in the AUTH payload field is DER code of an object identifier.

14. The communication device according to claim 10, wherein the signature information in the certificate comprises an object identifier, wherein the object identifier is code of the signature information in the certificate.

15. The communication device according to claim 14, wherein the program further comprises instructions for performing the following operations:
before filling the AUTH payload field in the IKE AUTH message based on the signature information in the certificate, determining that both the communication device and the second device support a digital signature; and
when both the communication device and the second device support the digital signature, filling the AUTH payload field in a digital signature manner, wherein a filling value of an algorithm identifier field in the AUTH payload field is DER code of the object identifier.

16. The communication device according to claim 10, wherein the program further comprises instructions for performing the following operation:
before parsing the certificate to obtain the signature information in the certificate, obtaining first configuration information, wherein the first configuration information indicates a type of operation for IKE authentication using a certificate.

17. The communication device according to claim 16, wherein
the type of operation for IKE authentication using a certificate is general certificate signature authentication; or
the type of operation for IKE authentication using a certificate is general asymmetric key algorithm authentication; and
when the type of operation for IKE authentication using a certificate is the general asymmetric key algorithm authentication, the first configuration information further indicates a source of signature information of the general asymmetric key algorithm authentication.

18. The communication device according to claim 10, wherein the program further comprises instructions for performing the following operations:
before filling the AUTH payload field in the IKE AUTH message based on the signature information in the certificate, determining that both the communication device and the second device support a digital signature; and
when both the communication device and the second device support the digital signature, filling the AUTH payload field in a digital signature manner, wherein a filling value of an algorithm identifier field in the AUTH payload field is distinguished encoding rules (DER) code of an object identifier.

19. The communication device according to claim 18, wherein the determining that both the communication device and the second device support a digital signature comprises:

obtaining second configuration information, wherein the second configuration information indicates that the communication device supports the digital signature; and obtaining an IKE security association (SA) message sent by the second device, wherein the IKE SA message indicates that the second device supports the digital signature.

20. A non-transitory computer-readable storage medium, wherein the computer-readable storage medium stores instructions that when executed by a processor performs:

parsing a certificate to obtain signature information in the certificate;

filling an AUTH payload field in an Internet key exchange protocol (IKE) identity authentication (AUTH) message based on the signature information in the certificate, wherein signature information indicated by the AUTH payload field matches the signature information in the certificate; and sending the IKE AUTH message to a second device.

\* \* \* \* \*